D. CAMERON.
RESILIENT WHEEL.
APPLICATION FILED MAY 31, 1918.

1,297,790.

Patented Mar. 18, 1919.
2 SHEETS—SHEET 1.

Inventor
Duncan Cameron

D. CAMERON.
RESILIENT WHEEL.
APPLICATION FILED MAY 31, 1918.
1,297,790.
Patented Mar. 18, 1919.
2 SHEETS—SHEET 2.
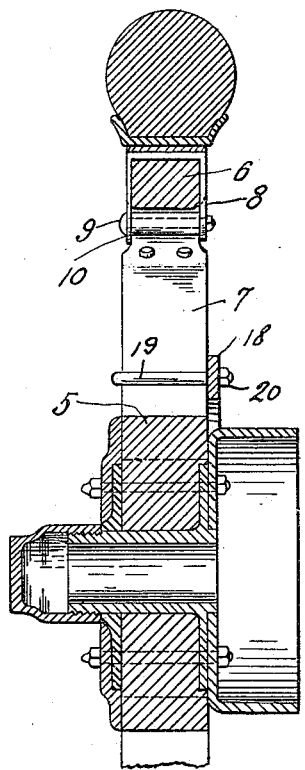
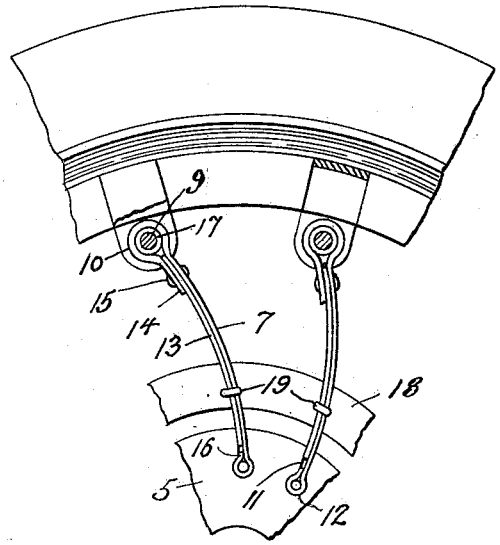
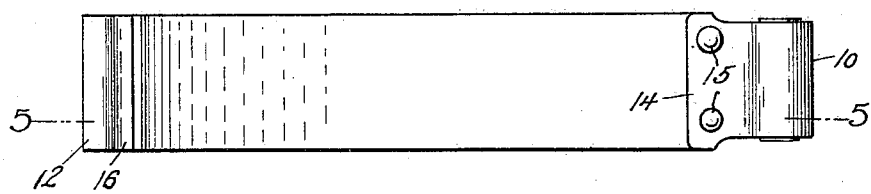
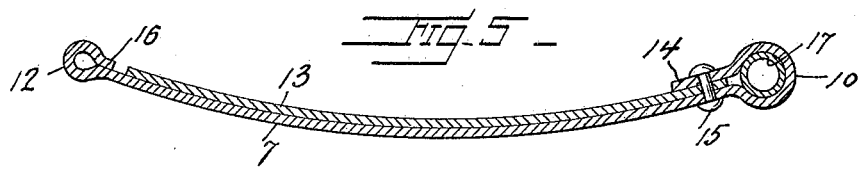
Inventor
Duncan Cameron
By
Attorney

UNITED STATES PATENT OFFICE.

DUNCAN CAMERON, OF DETROIT, MICHIGAN.

RESILIENT WHEEL.

1,297,790.

Specification of Letters Patent.

Patented Mar. 18, 1919.

Application filed May 31, 1918. Serial No. 237,491.

*To all whom it may concern:*

Be it known that I, DUNCAN CAMERON, a citizen of the United States, residing at Detroit, in the county of Wayne and State of Michigan, have invented certain new and useful Improvements in Resilient Wheels, of which the following is a specification.

This invention relates to improvements in the resilient wheel disclosed and claimed in my Patent No. 1252086 dated Jan. 1, 1918, the object of the present invention being to provide a stronger and more durable spring spoke, which will successfully withstand the strains to which it is subjected when the wheel is in use.

The object stated is attained by means of a novel combination and arrangement of parts to be hereinafter described and claimed, and in order that the same may be better understood, reference is had to the accompanying drawings forming a part of the specification.

In the drawings:

Fig. 2 is an enlarged cross section of one half of the wheel.

Fig. 3 is an enlarged side elevation of two spokes showing the manner in which they are secured.

Fig. 4 is a plan view of one of the spokes, and

Fig. 5 is a longitudinal section on the line 5—5 of Fig. 4.

Figure 1:
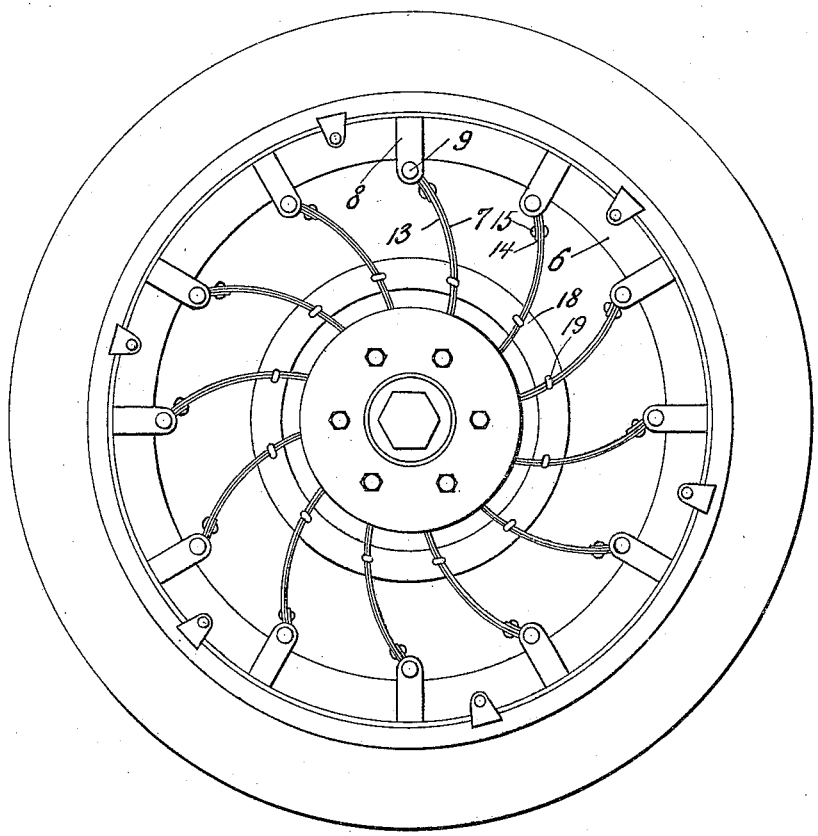
Figure 1 is a side elevation of the wheel.

Referring specifically to the drawings, the wheel has a hub plate 5, a felly 6, and a series of curved spring spokes extending therebetween, said spokes being flat leaf springs. The outer ends of the spring spokes are connected to the felly by U-shaped clips 8 and bolts 9. The clips straddle the felly and are set flush with the side faces thereof, the inner ends of the branches of the clips projecting inwardly of the felly so that the outer ends of the spokes may seat therebetween and be secured by the bolts passing therethrough. The extremities of the spokes are formed into eyes 10 through which the bolts 9 pass.

The inner ends of the spokes 7 are connected to the hub plate 5, said plate being circular and having radial notches 11 in its periphery in which said ends of the spokes seat. The inner ends of the spokes are also formed with eyes 12 and the inner ends of the notches are correspondingly enlarged to receive the same, whereby outward or radial displacement of the spokes is effectually prevented. The notches open through the sides of the hub plate, and the spokes are inserted and removed edgewise.

In order to strengthen and reinforce the spokes 7, they are provided each with an additional leaf 13. The outer end of the leaf forming the spoke 7 is bent to form the eye 10 and is continued back alongside the leaf for a short distance, and in spaced relation therewith, as indicated at 14. The leaf 13 fits the concave side of the leaf 7 and at its outer end it is rigidly fastened thereto, said end seating under the part 14 and being secured by rivets or other suitable fasteners 15. The leaf 13 extends throughout practically the entire length of the leaf 7, its inner end terminating close to the eye 12. The leaf 7 is bent to form the eye 12 and extended back for a short distance as shown at 16, from the extremity of which latter the inner end of the leaf 13 is spaced. The part 16 forms a stop to limit the movement of the leaf 13 in the direction of its length. When the spoke is not under load the inner free end of the leaf 13 is spaced from the stop 16. When a load is placed on the spoke, the leaf 7 flexes and as the leaf 13 is secured at one end only there is a relative sliding movement between the two leaves, the inner end coming nearer the stop 16, and when it reaches the stop, this relative movement of the leaves ceases, and the leaf 13 now prevents further flexure of the leaf 7, thereby preventing the same from breaking under excessive strains. The space between the stop 16 and the free end of the leaf 13 may be varied according to the size of the spoke used, and the latter in turn will be dimensioned according to the size of the wheel and the load to be carried. The notches 11 in the hub plate 5 are made wide enough to accommodate the free end of the leaf 13. The eye 10 is fitted with a bushing 17 to take up wear.

On one side of the spokes, between the hub and the felly of the wheel, is placed a rigid ring 18 carrying a series of hook bolts 19 secured by nuts 20. These bolts stand out from one side of the ring, and their hooked ends fit over one edge of the leaves 7 and 13. The spokes are thus firmly anchored to the ring, and the latter connects the same in a continuous series, so that the strain is distributed throughout the entire series of spokes, and each spoke is flexed more or less when the wheel is in action.

The retaining plates, etc., associated with the hub plate 5 for holding the inner ends of the springs may be the same as in my Patent No. 1252086 hereinbefore referred to.

I claim:

1. In a wheel, curved resilient spokes extending between the hub and the felly, each spoke comprising superposed spring leaves one of which is attached at one end to the hub and at its other end to the felly, and the other leaf being connected to the first-mentioned leaf at one end only and having its other end free and located adjacent to the corresponding end of the first-mentioned leaf to slide relatively thereto, and a member on the wheel for attachment of that end of the first-mentioned leaf which is located adjacent to the free end of the other leaf, said member having means for guiding said free end.

2. In a wheel, curved resilient spokes extending between the hub and the felly, and a member carried by the hub for attachment of the inner ends of the spokes, each spoke comprising superposed spring leaves, one of which is attached at one end to the aforesaid member and at its other end to the felly, and the other leaf being connected to the first-mentioned leaf at the felly end only, and having its inner end free and located adjacent to the hub end of the first-mentioned leaf, the hub-carried member having a radial recess in which the free end of the second-mentioned leaf slidably seats, and said second-mentioned leaf having a lengthwise movement relative to the other leaf when flexed.

3. In a wheel, curved resilient spokes extending between the hub and the felly, a member carried by the hub for attachment of the inner ends of the spokes, each spoke comprising superposed spring leaves, one of which is attached at one end to the aforesaid member and at its other end to the felly, and the other leaf being connected to the first-mentioned leaf at the felly end only, and having its inner end free and located adjacent to the hub end of the first-mentioned leaf, the hub carried member having a radial recess in which the free end of the second-mentioned leaf slidably seats, and said second-mentioned leaf having a lengthwise movement relative to the other leaf when flexed, and means in the recess opposite the free end of the second-mentioned leaf for limiting the sliding movement thereof.

4. In a wheel, curved resilient spokes extending between the hub and the felly, each spoke comprising superposed spring leaves one of which is attached at one end to the hub and at its other end to the felly, and the other leaf being connected to the first-mentioned leaf at one end only and having its other end free and located adjacent to the corresponding end of the first-mentioned leaf to slide relatively thereto, and a member on the wheel for attachment of that end of the first-mentioned leaf which is located adjacent to the free end of the other leaf, said member having a guide recess in which said free end slidably seats.

5. In a wheel, curved resilient spokes extending between the hub and the felly, each spoke comprising superposed spring leaves one of which is attached at one end to the hub and at its other end to the felly, and the other leaf being connected to the first-mentioned leaf at one end only and having its other end free and located adjacent to the corresponding end of the first-mentioned leaf to slide relatively thereto, a member on the wheel for attachment of that end of the first-mentioned leaf which is located adjacent to the free end of the other leaf, said member having a guide recess in which said free end slidably seats, and means in the recess for limiting the sliding movement of said free end of the leaf.

In testimony whereof I affix my signature.

DUNCAN CAMERON.